(12) United States Patent
Black et al.

(10) Patent No.: US 7,659,922 B2
(45) Date of Patent: Feb. 9, 2010

(54) INTERNET VIDEO SURVEILLANCE CAMERA SYSTEM AND METHOD

(75) Inventors: David Black, Delta (CA); Jeremy Craig Wilson, Delta (CA)

(73) Assignee: Honeywell Silent Witness Inc., Surrey, British Columbia (CA)

( * ) Notice: Subject to any disclaimer, the term of this patent is extended or adjusted under 35 U.S.C. 154(b) by 952 days.

(21) Appl. No.: 10/460,240

(22) Filed: Jun. 13, 2003

(65) Prior Publication Data

US 2004/0028391 A1  Feb. 12, 2004

(30) Foreign Application Priority Data

Jun. 13, 2002 (CA) .................................... 2390621

(51) Int. Cl.
    *H04N 7/18* (2006.01)
(52) U.S. Cl. .................. 348/143; 348/144; 348/145; 348/146; 348/147; 348/148; 348/149; 348/150; 348/151; 348/152; 348/153; 725/109; 725/110; 725/114; 725/116; 725/118; 725/138; 725/91; 725/92; 725/93; 725/95; 725/96; 725/97; 725/144; 725/145; 725/147; 725/115; 725/117

(58) Field of Classification Search .................. 725/109, 725/110, 114, 116, 118, 138, 91–97, 144–147, 725/115, 117; 348/143–159
See application file for complete search history.

(56) References Cited

U.S. PATENT DOCUMENTS

| | | | |
|---|---|---|---|
| 6,104,716 A | 8/2000 | Crichton et al. | |
| 6,349,336 B1 | 2/2002 | Sit et al. | |
| 6,996,630 B1 * | 2/2006 | Masaki et al. | 709/239 |
| 7,124,427 B1 * | 10/2006 | Esbensen | 725/109 |

* cited by examiner

*Primary Examiner*—Jason P Salce
(74) *Attorney, Agent, or Firm*—Husch Blackwell Sanders Welsh & Katz

(57) ABSTRACT

The invention consists of a system and method for transferring video images from video sources to video receivers using a video server as an intermediary. The video server creates a list of all the requests from the video receivers for a video image from a video source. The video server requests the video image from the video source and then sends the video image to each video receiver on the list. The video source is only required to send one image for any number of requests from video receivers and the video sources and video receivers have no direct connection to each other. The load of handling many video sources and many video receivers can be distributed amongst multiple video servers.

18 Claims, 13 Drawing Sheets

INTERNET VIDEO SURVEILLANCE CAMERA SYSTEM AND METHOD

FIELD

The invention is in the field of video surveillance and remote monitoring using video cameras connected to a computer network.

BACKGROUND

Video surveillance cameras connected to a computer network present a number of advantages over conventional analog Closed-Circuit Television (CCTV) systems. Among these advantages are the ability to remotely view a camera feed from anywhere on the network, the ability to store or replicate the digital video images without any signal degradation, the ability to send control messages back to the camera, and the opportunity to use digital image processing computers remote from the camera to automate some aspects of security video monitoring that would normally require an alert attendant. However, the use of such cameras across the Internet presents some unique challenges.

Various methods for distributing real-time or stored video are known. These can be usefully categorized as either data push methods or data pull methods.

In a data push method, the video source constantly sends (pushes) video data out into the network, a technique commonly referred to as multicasting. The video stream is associated with a unique Internet Protocol (IP) address called a multicast group. Network devices wishing to receive the video stream inform their local router of their desire to join the multicast group. Routers between the video source and the viewer are informed of the need to replicate the stream in the viewer's direction. When the multicast stream reaches the viewers local network segment, it is simply broadcast onto the segment and any computers wishing to use the stream recognize it by its unique multicast IP address.

While multicasting is well suited to mass distribution of live video or audio such as sporting events, news feeds, or music, it is not well suited to the specific needs of video surveillance for a number of reasons. In video surveillance, it is often unnecessary to broadcast every frame of video. Unlike an audio stream or a movie video in which a continuous data stream needs to be maintained in order to achieve acceptable sound or picture fidelity at the receiving end, in video surveillance having a regular frame rate is much less important than ensuring the fidelity of individual frames. For example, for basic monitoring purposes a rate of one frame per second can be quite adequate. However in the event of an alarm or other need for better real time data, a high frame rate may suddenly be desirable. Likewise, the frame rate demands of different users who are simultaneously accessing the camera can be quite different. For example, a security guard actively monitoring the video may desire a higher frame rate than is needed by a video recording application that is simultaneously accessing the video data at a low frame rate for long term archival reasons.

Different users may also have different image resolution requirements. For example, for general monitoring a 320× 240 pixel image is often sufficient, but a higher quality 640× 480 pixel image may be required to reliably recognize a persons face seen in the image. The nature of packet switched computer networks also results in varying data rates to different users depending on the network bandwidth available between each user and the video source.

Another problem is that it is common for multiple security cameras to share a local network, and therefore having every camera push all its video data onto the local network is often unacceptable to other users of the network and is a poor utilization of the network resources. Also, typical multicasting protocols provide no user authentication capability. In the case of security cameras, it is normally important to the owner of the surveillance system to protect against unauthorized access to the cameras. Similarly, it is common for local area networks to be protected from the Internet by a firewall for network security reasons. While it is possible to broadcast a video stream out through a firewall, the firewall prevents any back channel to the video source to control its video feed.

As noted above, using a computer network for the video surveillance system provides the opportunity for other applications on the network to interpret the video feed and add additional high level information such as indicating motion or recognizing a face. A multicasting system provides no ready means to integrate this additional information from other sources into the camera's video stream.

As a consequence of these problems with multicasting, the common approach to network security cameras is to use a data pull method, where data is only sent from the camera to a user upon request. The most common means of implementing a data pull method is for the camera to run a web server. Users wishing to see pictures from the camera connect to it using their web browser by entering the cameras IP address or domain name. This approach solves some of the problems mentioned above with multicasting, such as not sending data when it is not needed and the ability to provide typical web based user authentication. However, this approach does not solve all of the issues, and introduces several new issues.

First, the frame rate that can be delivered by the camera quickly degrades as more users access one camera. Without special browser plug-ins, even the frame rate to a single user is typically much lower than can be achieved using streaming methods like multicasting. Further, while multicasting ensures that only one copy of the data needs to be transmitted on any given network segment, the web server approach is much less efficient for the case of multiple users because the server has to replicate the data transmission for each user thus making poor use of local network bandwidth.

Some of the problems associated with multicasting remain unresolved with the web server system. The camera's web server is not normally accessible through a firewall without specifically configuring the firewall to allow these connections. Also, the web server method provides no convenient means to augment the basic video data with higher level interpretations from video analysis applications running elsewhere on the network.

Unlike multicasting, there is no way for a web server behind a firewall to register its services with an outside server so that, as new cameras are added to or removed from the system, an outside user can readily determine what cameras are available. Similarly, the IP address of the camera must be statically allocated, rather than dynamic, otherwise users will not be able to reliably access the service. This greatly increases the level of setup complexity in comparison to network devices that use a service such as DHCP to automatically obtain an IP address and other crucial configuration information.

Finally, for a security camera network with many cameras there is no centralized facility for management of user authentication and for global camera configuration and camera software updates. In summary, the web server (data pull)

approach fails to address the basic issues of system scalability required of any larger scale enterprise system, such as a video surveillance system.

The particular problem of accessing a network service hidden behind a firewall has been addressed by various systems and methods known in the art, typically known as tunneling. For example, U.S. Pat. No. 6,104,716 describes a method for a server, hidden by the firewall, to be contacted via the Internet by a client application on a separate local network also protected by a firewall. A server side proxy initiates a connection out through the firewall to a trusted middle proxy located at a public Internet address. Similarly, a client side proxy initiates a connection through its firewall to the same middle proxy. After the connection is authenticated, the three proxy agents together provide a virtual secure tunnel between the client and server. Neither the client nor server need be explicitly aware they are dealing through a proxy rather than interacting directly. Once the tunnel is established, the proxy chain acts only as a pass through mechanism, and does not interpret the data in any way. U.S. Pat. No. 6,349,336 describes an alternative arrangement of proxy agents for a similar purpose. While addressing the need to connect applications not originally intended for interaction through firewalls, these methods fail to resolve the other issues described above for a camera with a web server system.

It is therefore an object of the present invention to provide a means for one or more end users, who may be hidden behind firewalls, to access via the Internet one or more video cameras that may also be hidden from the Internet by a firewall, and to do so without requiring any modifications of the firewalls or any special services in the IP routers and gateways of the network.

It is a further objective of the present invention that the cameras have their network configuration automatically assigned by a service such as DHCP so that no configuration is required by the person installing the camera.

It is a further object of this invention to avoid having to send duplicate copies of camera data on the camera's local network segment.

It is a further object of this invention that the system be readily scalable from a small number of cameras to a large number of cameras, and from a small number of users to a large number of users.

It is a related object of this invention that the failure of any one element of the system should have little or no impact on the operation of the rest of the system.

It is a further object of this invention to support independent data rates and independent data formats to each camera user based on their needs and the available bandwidth.

It is a further object of this invention to be able to implement services elsewhere on the network that provide for higher level interpretations of the camera's raw data, acting as both consumers of video data and producers of interpreted video data.

It is a further object of this invention to provide for centralized management of a group of cameras and a group of users, including implementation of user and camera authentication, centralized management of configuration issues such as software updates for cameras or end users, and a database of information specific to each camera such as camera parameter settings and camera geographic location.

It is yet another objective of the present invention to support access to, and control of, non-real-time video sources such as digital video recorders within the same system framework.

In the event that a camera has a public IP address, it is a further objective of the present invention to avoid making public the IP address of a camera in order to reduce the likelihood of hacking attempts or denial of service attempts on the camera.

SUMMARY OF INVENTION

One or more video sources, such as cameras, are connected to a local network, with access to the Internet. This local network may be protected by a firewall. A video source automatically initiates a connection to a trusted primary video server at a predefined public address on the Internet. The primary video server authenticates the video source's identity, completing the establishment of the connection. Users wishing access to the video surveillance system also connect to the primary video server, and are similarly authenticated. Thus both video sources and users are clients of the video server.

A user thus connected is presented with a variety of video services, such as a list of available video sources, their operational status, and their location within a building plan or geographic map. However it is not necessary for the video server to reveal the IP address of any video sources, and instead it can use some other unique identifier for each video source.

The video server acts to aggregate video frame requests to video sources and to replicate the video frames out to users. The video server only requests a frame from the video source when there is a request for a frame from a user. While this request to the video source remains outstanding, the video server registers any further requests for the next frame from that video source, but it does not generate any additional requests to the video source. When the video server receives the requested frame from the video source it then replicates the frame to each user that had requested it. In this way, the present invention combines many of the benefits of both data pull and data push methods: data pull comes in the form of requests from users; data push is the process of replicating frames back to users in a fashion analogous to multicast.

The primary video server is a very natural means to support centralized management of a group of video sources and a group of users, including implementation of user and video source authentication, centralized management of configuration issues such as software updates for video sources or end users, and a database of information specific to each video source such as video source parameter settings and video source geographic location.

For the purposes of load balancing and scalability, and at any time after a connection has been authenticated, a video server can indicate to one of its clients that it should close its connection and open a new connection on another video server at another public address. The video servers maintain connections with each other to keep track of which video sources are connected to which servers. When a user on a first server requests a frame from a camera that is connected to a second server, the first server acts as a video user of the second server to acquire the frame and then passes the frame on to the user that requested it. In this way, when many users are accessing a single video source the replication loading can be distributed across more than one video server.

BRIEF DESCRIPTION OF THE DRAWINGS

The invention itself both as to organization and method of operation, as well as additional objects and advantages thereof, will become readily apparent from the following detailed description when read in connection with the accompanying drawings.

DETAILED DESCRIPTION

Figure 1:
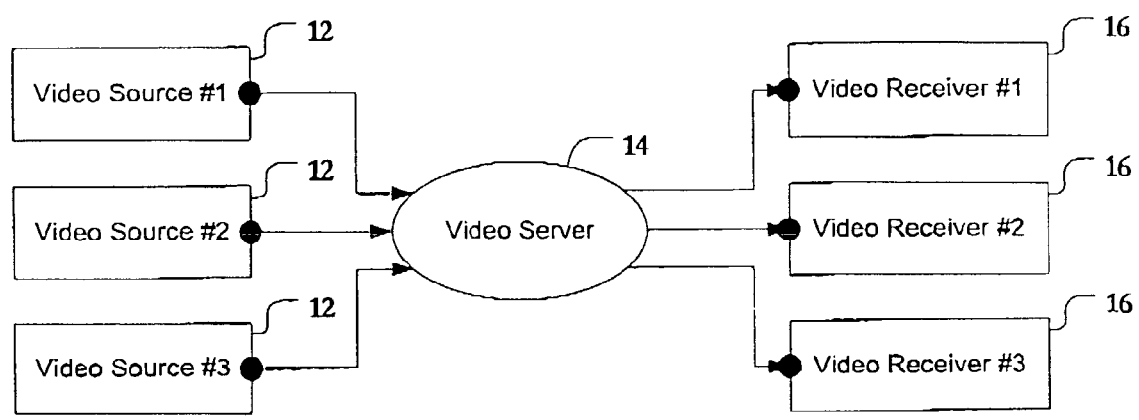
FIG. 1 is a simple network topology diagram illustrating the three basic elements of the video distribution system: a video source, video server, and video receiver.

FIG. 1 illustrates the three basic elements of the video surveillance system: one or more video sources 12, a video server 14, and one or more video receivers 16 are connected via TCP/IP. In FIG. 1 and FIGS. 4-7, the arrowhead on each connection is used to indicate the flow of video data. However, as with any TCP/IP connection, other types of messages flow in either direction. A dot at one end of the connection indicates the end that initiated the connection. As illustrated, video sources 12 and video receivers 16 initiate their connections to the server 14. One type of video source 12 is a digital security camera. The most likely type of video receiver 16 is a video viewing program, presenting a view of one or more cameras to a user on a personal computer. A device that provides digital video storage services to the system would act as a video receiver 16 while recording video, and as a video source 12 when replaying stored video. To make the system scalable, a server 14 is able to act as a video receiver 16 and/or a video source 12 for another server. The multi-server system is described in more detail below. A software program running on a computer could also act as either a video source 12 or as a video receiver 16, or both. Such a program could provide a variety of image processing services to the system to modify or interpret the contents of video images from other video sources 12, including image reformatting or image interpretation such as face recognition.

Figure 2:
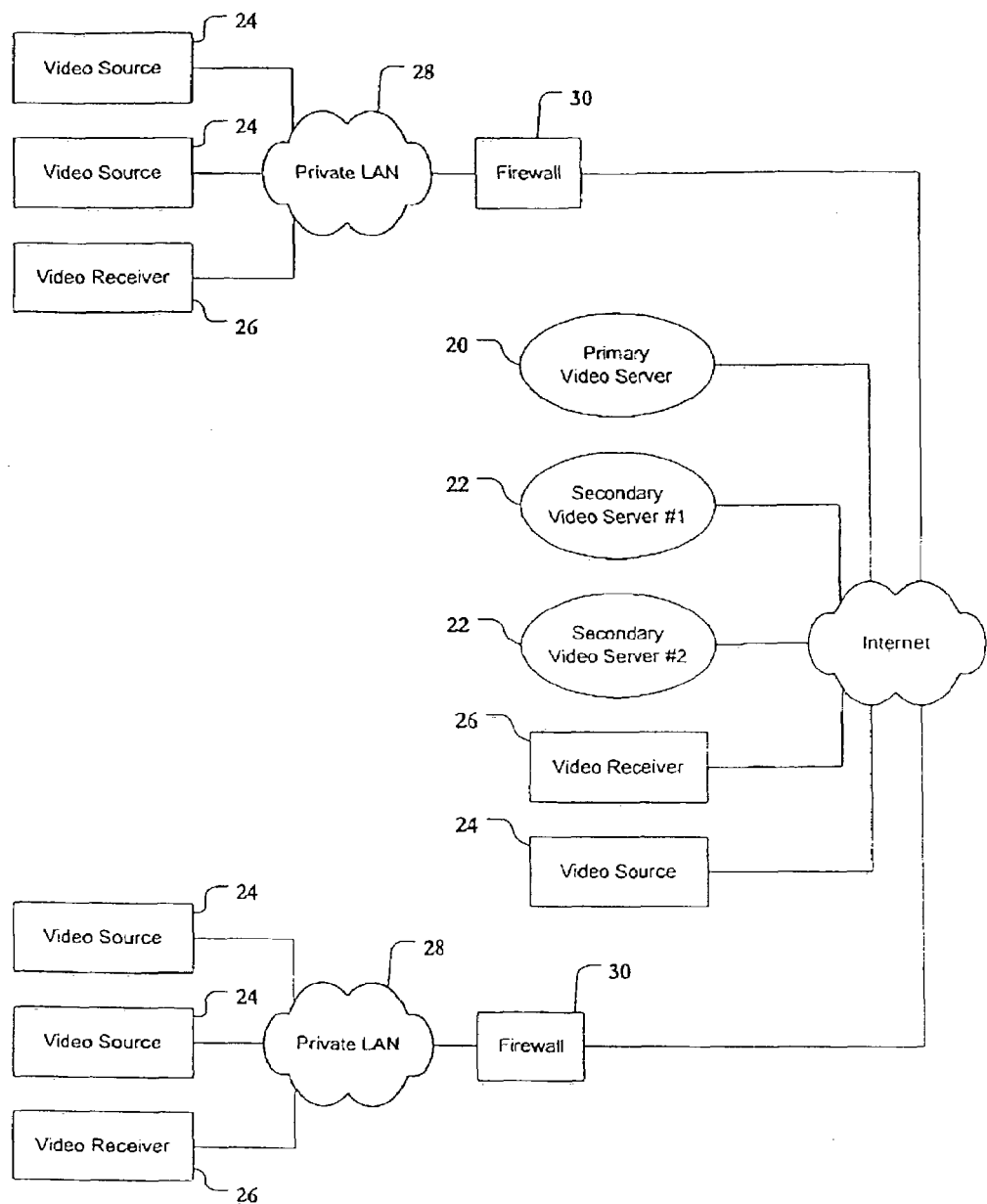
FIG. 2 is a network topology diagram illustrating some network configurations supported by the present invention.

FIG. 2 is a network topology diagram illustrating a typical network configuration supported by the present invention. As shown, one or more video servers 20, 22 are located at public IP addresses. Because both video sources 24 and video receivers 26 initiate the connection to the server, they can still establish a connection with a server when hidden from the Internet by firewalls 30 when operating over a private Local Area Network (LAN) 28, because a firewall does not normally block outgoing connection requests. Via a server, any video receiver 26 is able to obtain video frames from any video source 24 that it is authorized to access, irrespective of whether the video receiver 26 or video source 24 are located at public or private addresses. The primary video server 20 acts as the first point of contact for any video source 24 or video receiver 26. To support load balancing, scalability, and fault tolerance, the primary server 20 can request that a video source 24 or video receiver 26 reconnect to a secondary server 22.

FIGS. 3A-3G are a series of protocol diagrams illustrating the steps in the interactions between a video source, the video server, and a video receiver. The interactions can be divided into two groups, which may be implemented as two independent protocols: messages between a video source and a video server, and messages between a video receiver and a video server.

The video server must maintain the following lists: a list of video sources that are connected to it; a list of video receivers that are connected to it; and a distribution list for each video source indicating which video receivers are waiting for the next video frame from that source.

Figure 3A:
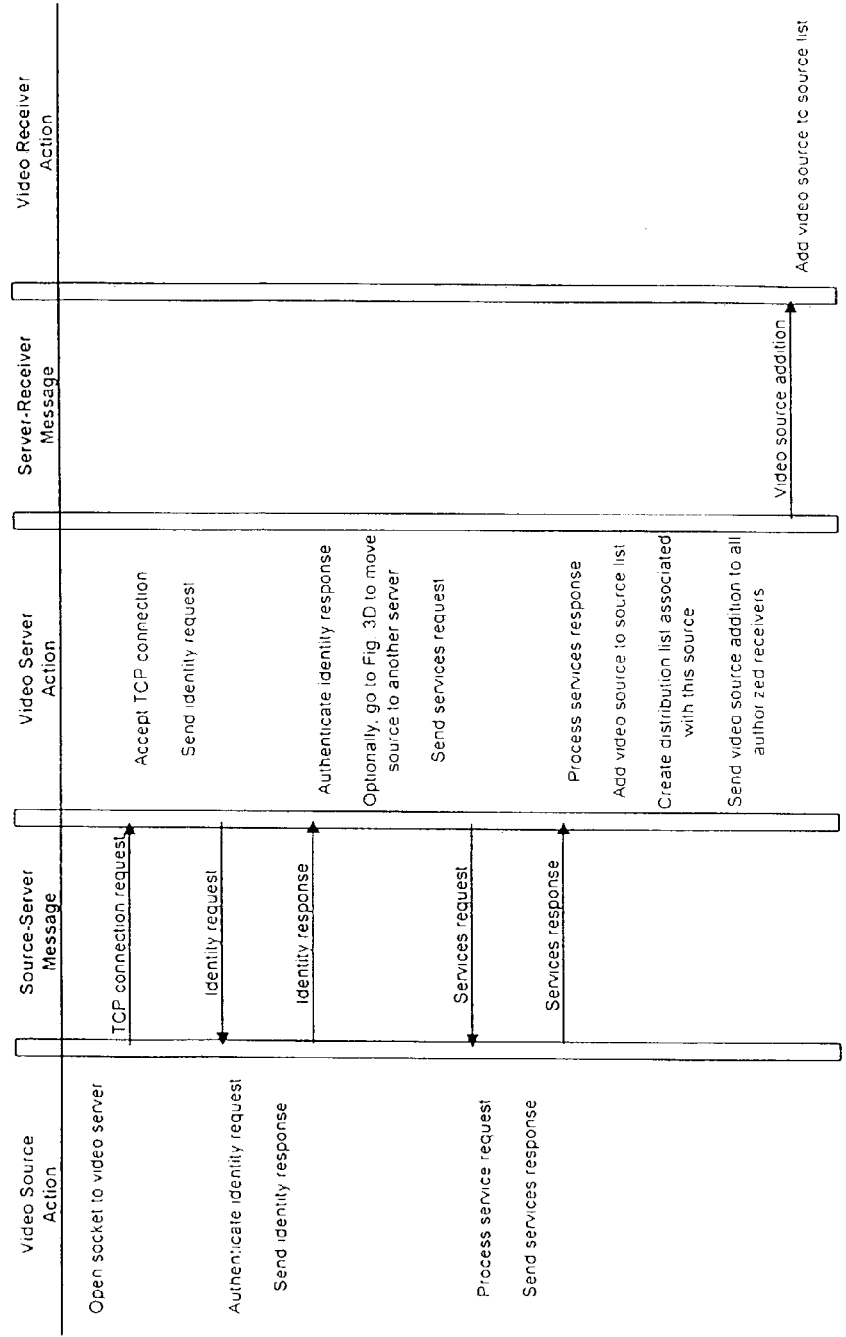
FIG. 3A is a protocol diagram illustrating the steps in connecting a video source to a video server.

FIG. 3A illustrates the steps involved in a video source connecting to a video server. The video source first initiates a TCP connection to the server using a predefined TCP port on the server. The server, which is always listening for connections on this port, accepts the connection. The server then requests that the video source identify itself. The video source authenticates this request, and replies with its unique identity information. On receiving this information, the server verifies its authenticity. If the server wishes to hand off the video source to another server it can now do so, following the steps outlined in FIG. 3D.

Normally, the server will support this video source. In this case, it then issues a services request to the video source. The video source responds by enumerating the video services it provides. For example, a video source may need to indicate if it is a camera or a video storage device, how many alarm inputs and relay outputs it has, and how many video channels it has. On receiving this service information, the server then adds the video source to its video source list along with the service info, and creates a distribution list associated with this source. The distribution list is used to aggregate requests from video receivers in relation to this video source. Finally, the server informs any video receivers connected to it about this new video source.

Figure 3B:
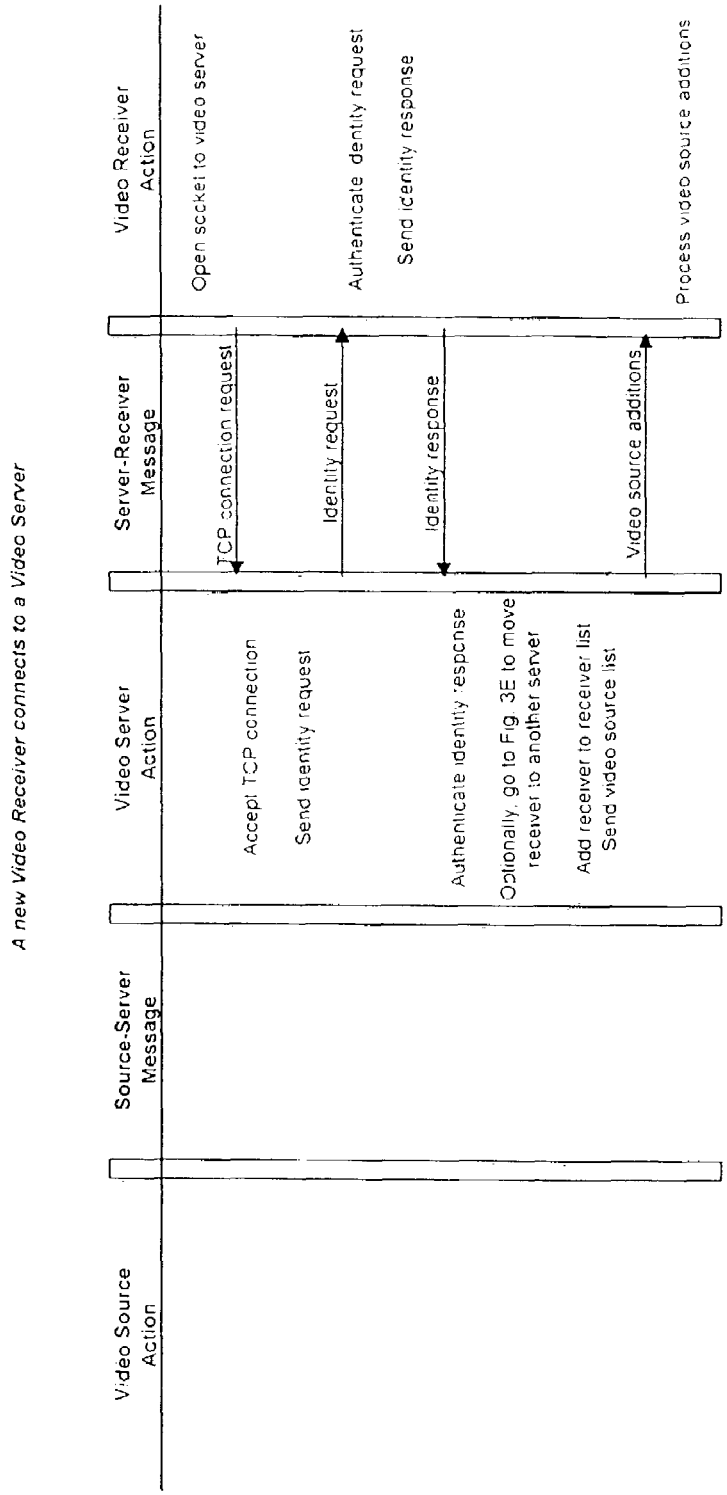
FIG. 3B is a protocol diagram illustrating the steps in connecting a video receiver to a video server.

FIG. 3B illustrates a similar series of steps required for a video receiver to connect to a server. The video receiver first initiates a TCP connection to the server using a predefined TCP port on the server. The server, which is always listening for connections on this port, accepts the connection. The server then requests that the video receiver identify itself. The video receiver authenticates this request, and replies with its unique identity information, which includes an indication of whether the video receiver is also a server. On receiving this information, the server verifies its authenticity. If the server wishes to hand off the video receiver to another server it can now do so, following the steps outlined in FIG. 3E.

Normally, the server will support this video receiver. In this case, it adds the video receiver to its receiver list, and sends to the receiver a list of the video sources that the receiver is authorized to access. In the case where the video receiver is also a video server, the first video server connects to the second video server as a video receiver so that they both have access to each other's video sources. This is shown in further detail in FIG. 4.

Figure 3C:
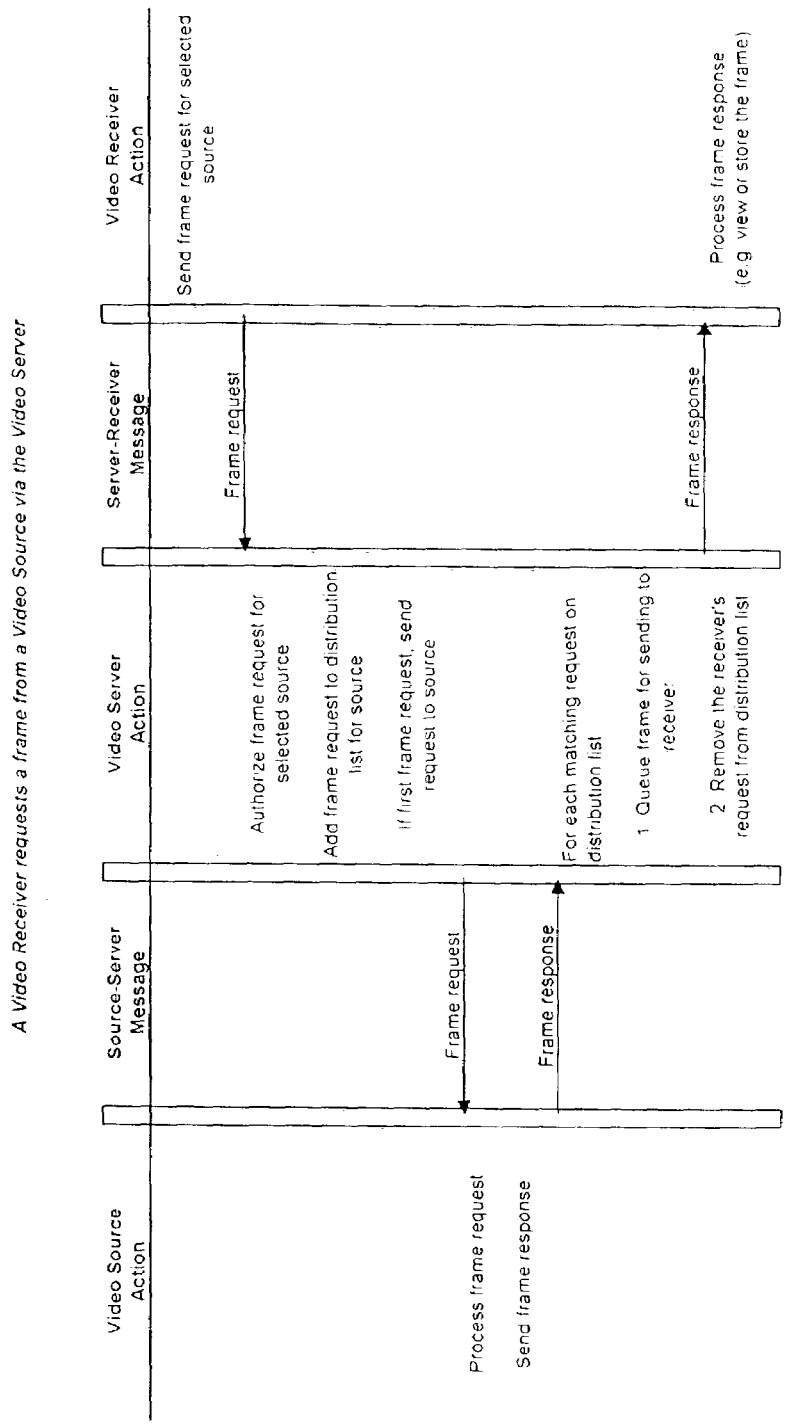
FIG. 3C is a protocol diagram illustrating the steps in transferring a video frame between a video source, and a video receiver.

FIG. 3C shows the steps involved in a video receiver requesting a frame from a video source. First, the video receiver sends a frame request to the server, indicating which video source it wishes to obtain a frame from, and the time index of the frame. The time index is either a specific value, or an indication that the video receiver wants the next new frame from the source.

The purpose of the specific time index in the request is to support access to digital video storage devices, and to also support cameras that maintain a short history of recent frames. This latter case is useful where a video receiver wants to gain access to frames that were captured and stored by the camera in the moments before an alarm was triggered to help the user better ascertain the cause of the alarm event.

Upon receiving the frame request, the server authenticates that the video receiver is allowed access to the requested video source, and then adds the receiver to the frame distribution list associated with that video source. If this is the first request on the list, or the time index of the request does not match the time index of any other request on the list, a frame request along with the specified time index is sent to the video source. However, if there are already other receivers waiting for the specified frame, no further frame request needs to be sent because there must already be a request pending.

When the video source responds with a frame, the server forwards the frame to all receivers on the distribution list whose requested time index matches the incoming frame. The video source identity is included in the frame message forwarded to the video receiver so that the video receiver can differentiate between outstanding requests for frames from multiple sources. At the same time a video receiver's request for a frame is queued for sending over the TCP/IP connection to that user, the request is removed from the distribution list. The moment a video receiver begins receiving a frame, it can issue a new request for the next frame. It does not need to wait for the full frame to be received because the request associated with the frame being received has already been removed from the distribution list on the server. Consequently the frame-to-frame latency can be minimized and a reasonable video frame rate maintained.

A feature of this method of managing video distribution is that the video server only distributes frames to each receiver at a rate that they can consume them, keeping the server and network loading to a level based on the actual receiver demand and available bandwidth. Receivers with fast connections will be able to make requests more often and so appear more often on the distribution list, while receivers with slow connections will naturally appear less often on the distribution list. A consequence of this method is that the server does not need to maintain any state information about which receivers are interested in which video sources, apart from the distribution lists which only contain entries while a frame is pending from a source. Therefore a video receiver can quickly switch from one source to another, or as noted above, make almost simultaneous requests from more than one source, for example, in order to maintain a display of several sources at the same time, which is a common requirement for surveillance video monitoring.

In a preferred embodiment, the format of the frame request from the video receiver to the video server is identical to the format of the frame request from the video server to the video source. This means that when a first video server needs a frame from a video source that is connected to a second video server, the first server can use the same protocol to request the frame from the second server as it would if it were directly connected to the video source.

Figure 4:
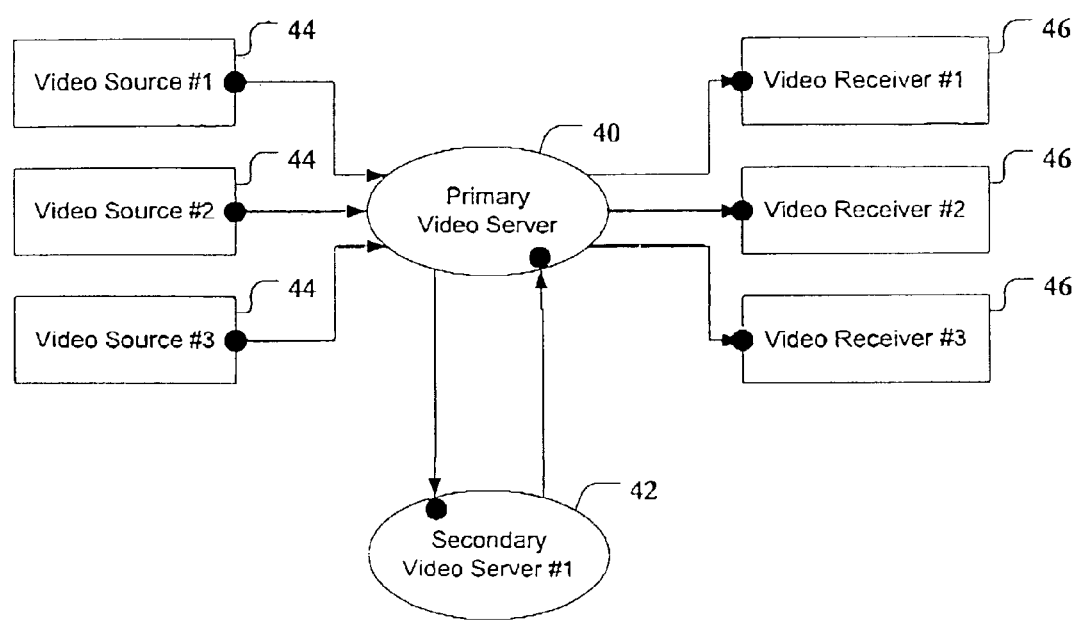
FIG. 4 is a network topology diagram illustrating how a secondary server establishes a connection to a primary server.
Figure 7:
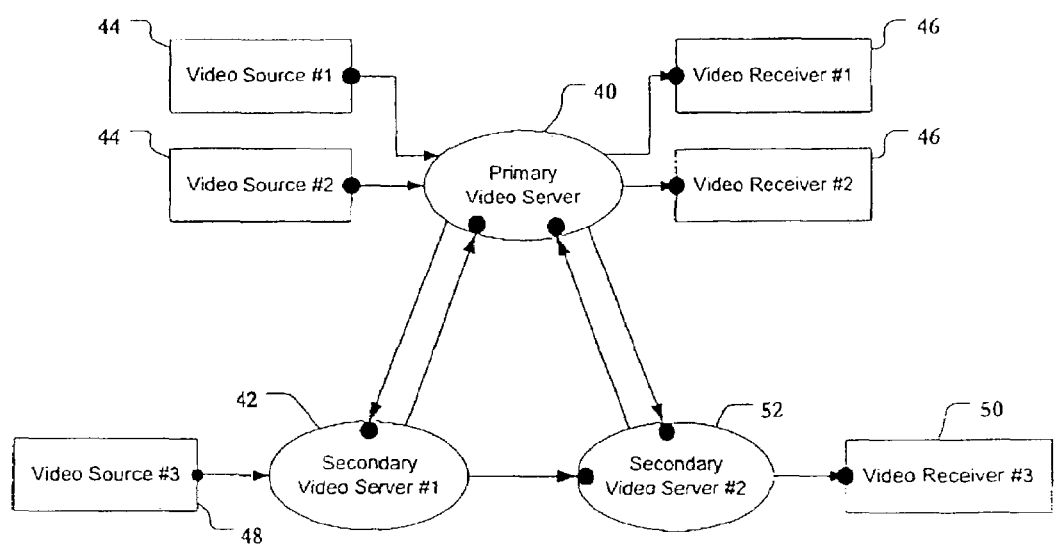
FIG. 7 is a network topology diagram illustrating one secondary server connecting directly to another secondary server.

FIG. 4 is a network topology diagram illustrating how a secondary server 42 establishes a connection to a primary server 40. The secondary video server 42 initiates a connection to the primary video server 40 as a video receiver. Consequently, the secondary server 42 receives a list of video sources 44 connected to the primary server 40, which includes any other secondary servers (as shown in FIG. 7) already connected to the primary server 40. Interaction between two or more secondary servers is described in further detail below in relation to FIG. 7.

As part of the primary server's 40 authentication process for the connection from the secondary server 42, the primary server 40 is made aware that the video receiver that has just connected is actually a video server. The primary server 40 responds by initiating a connection to the secondary server 42 as a video receiver, so that it can be made aware of any video sources 44 that connect directly to that secondary server. In this way the primary server 40 is kept informed of all available video sources 44.

Figure 3D:
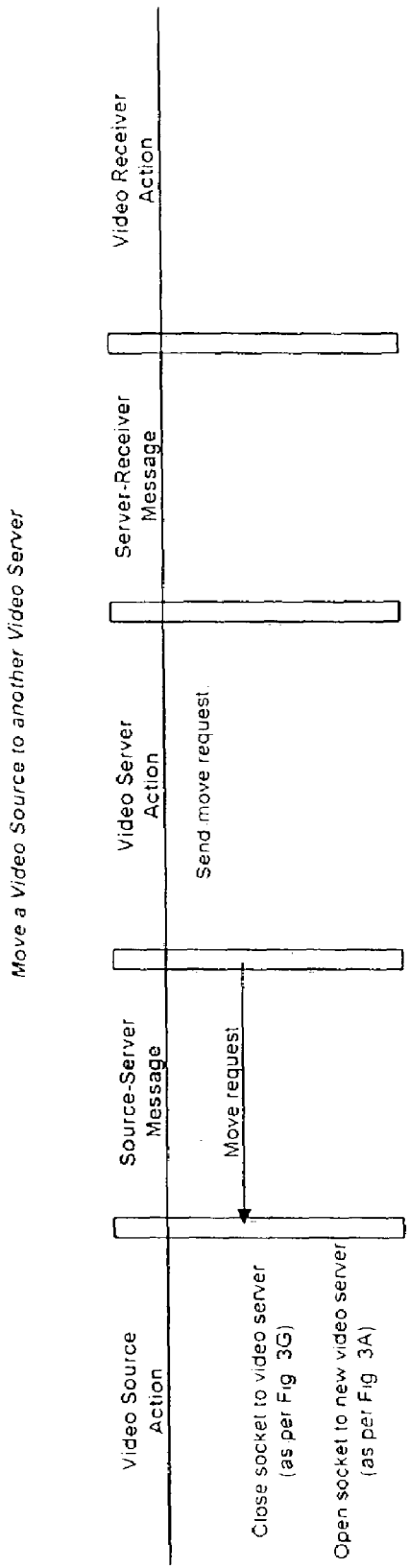
FIG. 3D is a protocol diagram illustrating the steps in transferring a video source to a secondary video server.
Figure 3E:
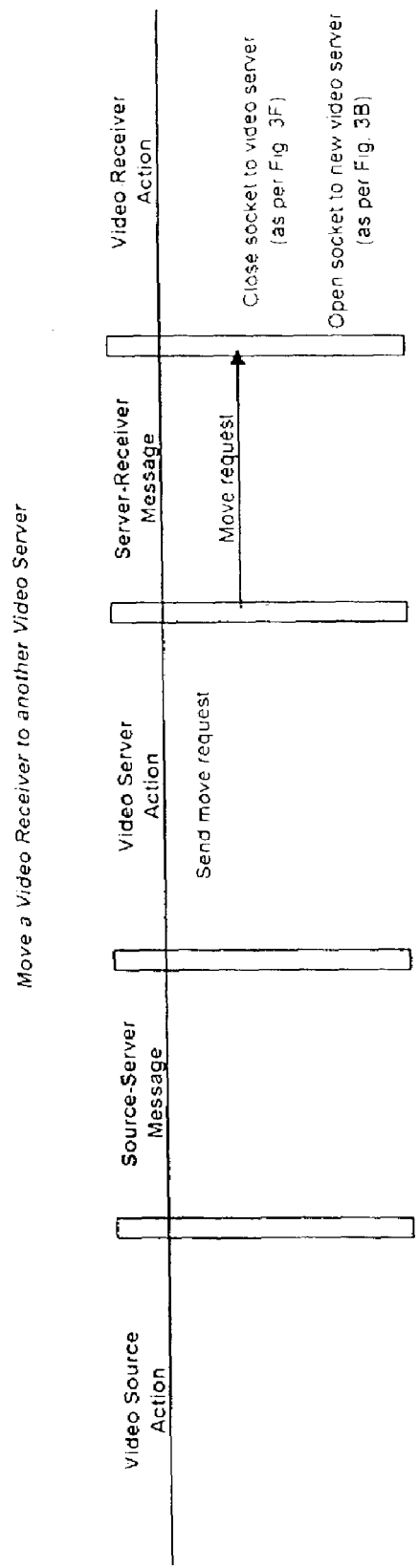
FIG. 3E is a protocol diagram illustrating the steps in transferring a video receiver to a secondary video server.

At any time, such as when the primary server 40 determines that it is getting overloaded, the primary server 40 can choose to move a video source 44 or video receiver 46 to a secondary server 42. FIG. 3D shows the steps for moving a video source 44 from one video server to another, and FIG. 3E shows a similar series of steps for moving a video receiver 46 to another server. In either case, the first step is to send the move request from the primary server 40 to the client (either a video source 44 or video receiver 46). The client then closes the current TCP connection, and attempts to open a new connection with the specified secondary server 42. If this fails, the client will attempt to reconnect to the primary server 40.

Figure 5:
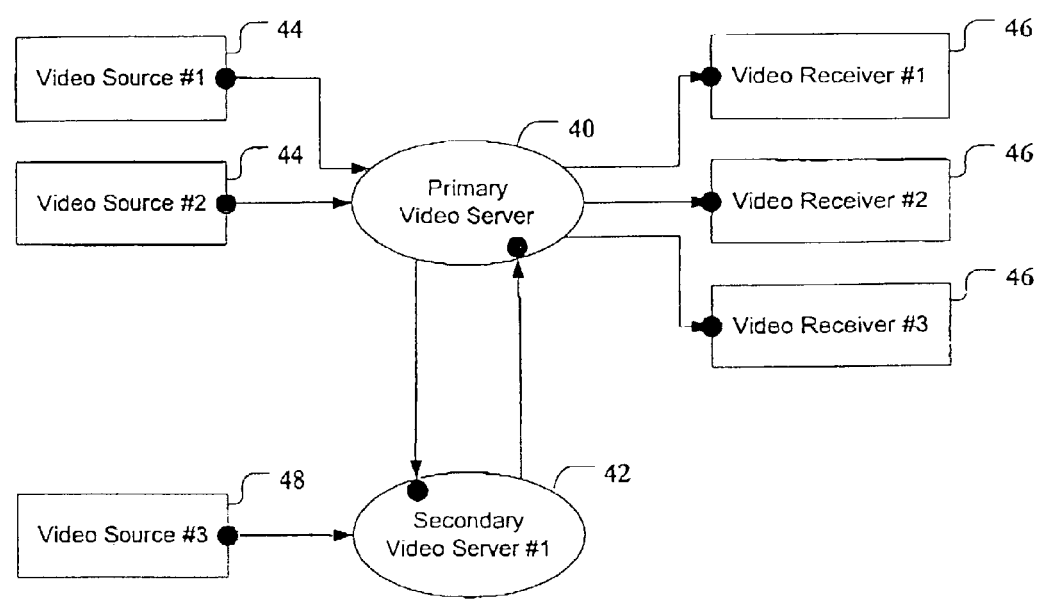
FIG. 5 is a network topology diagram illustrating the result after the primary server hands off a video source to a secondary server.

FIG. 5 is a network topology diagram illustrating the result after the primary server 40 hands off a video source 48 to a secondary server 42 in the manner described in FIG. 3D. When the video source 48 connects to the secondary server 42, the secondary server 42 informs its video receivers 46 of this new video source 48. Because the primary server 40 is connected to the secondary server 42 as a video receiver, it is informed of this new connection.

Generally, whenever a first video server (primary 40 or secondary 42) is informed of a video source 48 by a second video server (primary 40 or secondary 42), the first server adds it to its video source list along with the identity of the second video server, so that any requests the first server receives for frames from that source will be directed to the second server. However, it is treated exactly as any other video source 44, with an associated distribution list. The first server then informs all of its video receivers 46 (including other servers acting as video receivers) who are authorized to view this video source 48 of the availability of this video source 48. The exception is the second server itself, which does not need to be informed of the video source 48.

An advantage of this approach is that simply by a first server asking a video source 48 to move to a second server, the task of updating all interested parties occurs quite automatically as a result of the disconnection of the video source 48 from the first server and reconnection of the video source 48 to the second server. There are no difficult intermediate states in which the first server needs to maintain the fact that the video source 48 is in a state of transition to another server. As noted earlier, every secondary server 42 is a video receiver of the primary server 40, and the primary server 40 is a video receiver of every secondary server 42. So the primary server 40 automatically acts as a means to distribute video source information out to the entire video system.

Figure 6:
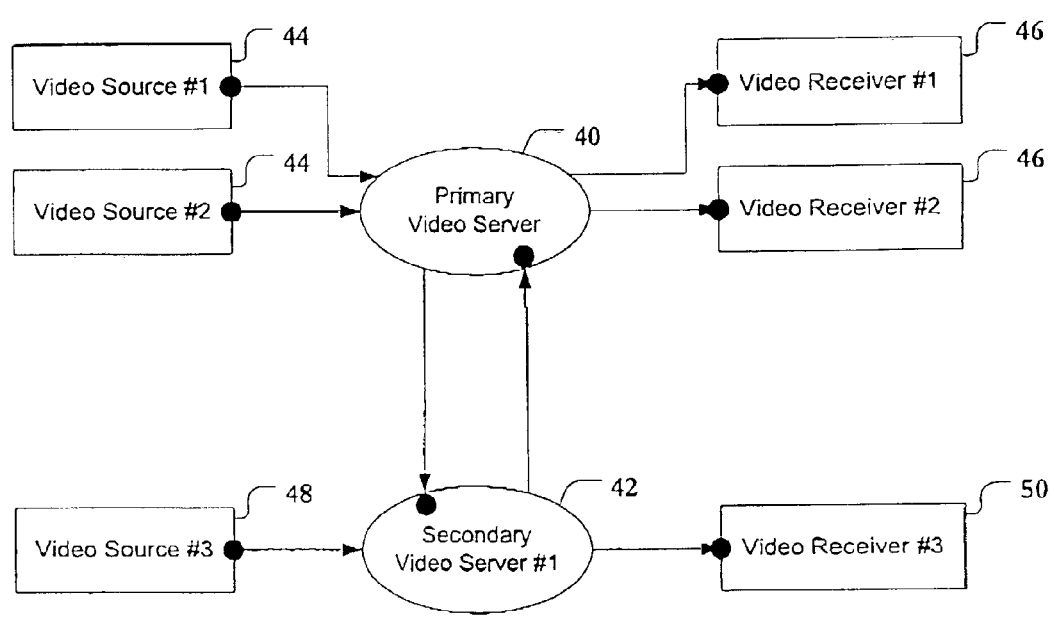
FIG. 6 is a network topology diagram illustrating the result after the primary server hands off a video user to a secondary server, which already has one video source attached.

FIG. 6 is a network topology diagram illustrating the result after the primary server 40 hands off a video receiver 50 to a secondary server 42, which already has one video source 48 connected. Because the secondary server 42 is aware of both its own video source 48 and the video sources 44 available from the primary server 40, all these video sources 44, 48 are also available to the video receivers 46, 50, who need not even be made aware that the video data from some video sources 44, 48 is coming indirectly to them via another server.

Figure 3F:
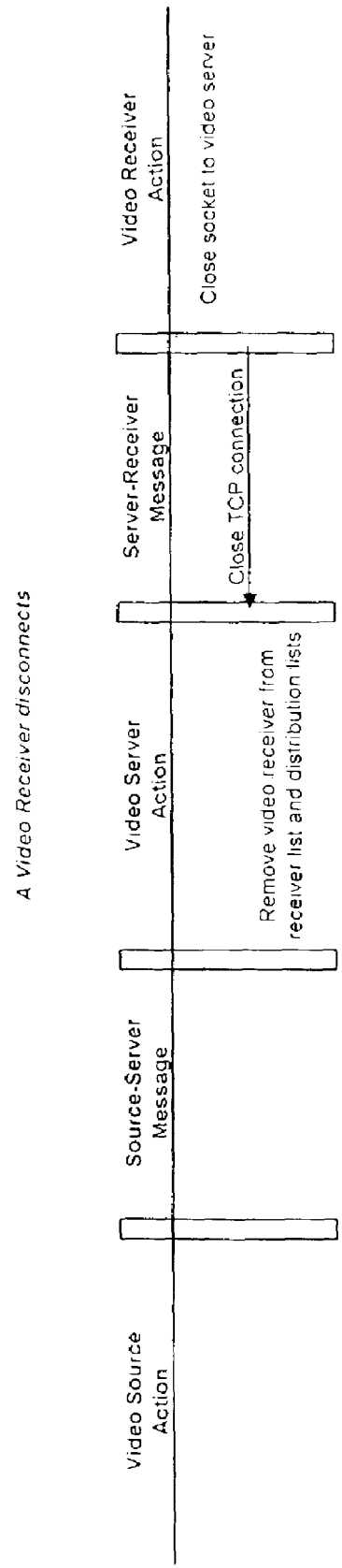
FIG. 3F is a protocol diagram illustrating the steps in disconnecting a video receiver.
Figure 3G:
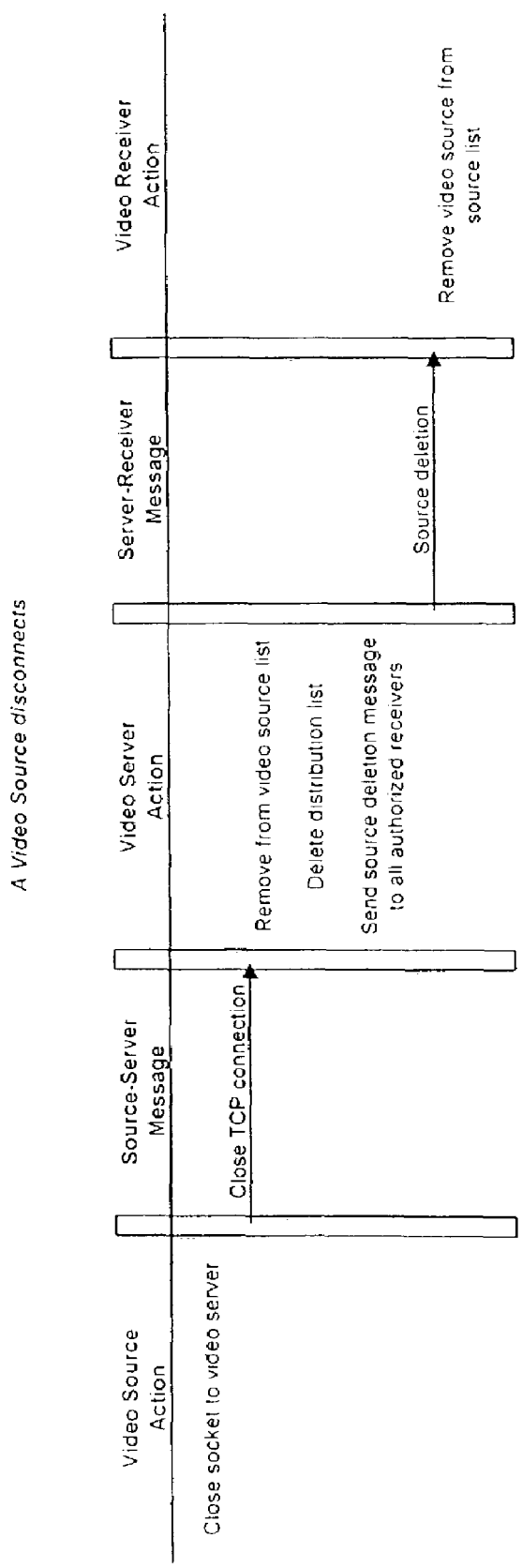
FIG. 3G is a protocol diagram illustrating the steps in disconnecting a video source.

FIGS. 3F and 3G show the steps followed when a video receiver 46 or video source 44 disconnects, respectively. Disconnection can occur for a variety of reasons such as a camera being switched off, a viewing application on a PC being shut down, a move request from a server as described above, or a connection failing to respond to a request within a timeout period. When a video receiver 46 disconnects it is removed from the server's video source list and from any distribution lists in which it has outstanding requests. When a video source 44 disconnects, it is removed from the video source list, and its distribution list is deleted. Any pending frame requests on that list are replied to with a message indicating that the source is no longer available. The video receivers 46 interested in that video source 44 either remove the source from their own source list, or if currently interested in that source, they must mark the source as unavailable and then wait until they see an update message indicating that the source is available again.

While the foregoing discussion has used distribution lists solely for distributing video frames, they can also serve other important purposes. In particular, some video receivers 46 may not be actively requesting frames from a video source 44, but may wish to be supplied with a frame associated with certain events at that video source 44. These include a change on an alarm input or the occurrence of video motion. Consequently, a preferred embodiment of the invention also incorporates event designators in the frame request message, other than just a frame index.

FIG. 7 is a network topology diagram illustrating one secondary server 52 connecting directly to another secondary server 42. A first secondary server 52 can at any time establish a connection with a second secondary server 42 in order to obtain more direct access to the video sources 48 attached to the second server 42. In this case the first server 52 needs to be aware that it will receive two notifications any time a video source 48 connects or disconnects from the second server: the first server 52 will receive a notification directly from the second server 42; the first server 52 will also receive a notification from the primary server 40.

The video source list on any server should be maintained in such a way that the most direct route is used for requesting frames from a video source 44, 48. This can be simply achieved by always incorporating in the video source notification message the IP address of the server to which the video source 44, 48 is directly connected. This information is also useful to other video receivers 46, 50 who may wish to establish a connection with the server closest to the video sources 44, 48 of greatest interest to them.

Another advantage of the present invention is that any element of the system can fail without disturbing the entire system. The primary server 40 is the most critical element. However, in the event of a temporary failure of the primary server 40, the system will recover automatically as soon as the primary server 40 is running again, because all of its clients (video sources 44 and video receivers 46) will periodically try to reconnect with it. Because of the primary server's more central role, it is likely that in a system with a large number of video sources 44, 48 and/or video receivers 46, 50, the primary server 40 would always hand off video sources 44 and video receivers 46 to secondary servers 42, 52, and therefore only act as a central meeting point and central distribution point for up to date information on video sources 44, 48. The secondary servers 42, 52 would interconnect with each other as needed to satisfy the requests from their video receivers 46, 50.

With the primary server 40 used in this way, if it fails then the distribution of video frames from currently connected video sources 44 to currently connected video receivers 46 is not disrupted. To add further to the reliability of the system, in a preferred embodiment of the system, each video receiver 46 and video source 44 should maintain a local record of the most recently used secondary server 42 so that in the event that it is temporarily unable to connect to the primary server 40 it can attempt a connection to a secondary server 42 instead.

While the preceding discussion has assumed the Internet is used as the means of communication between video sources 44, video receivers 46, and video servers 40, 42, to anyone skilled in the art it will be clear that other private network topologies with no Internet connection would also benefit from the present invention. The primary server 40 need only be at an address that is 'public' from the point of view of both the video sources 44 and video receivers 46.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. A system for sending video images, comprising:
    a) a primary server;
    b) one or more video sources connected to said primary server, said video sources operative to send video images to said primary server only upon receiving a request from said primary server;
    c) one or more video receivers connected to said primary server, said video receivers operative to receive video images from said primary server upon sending a request to said primary server which also is said request by said primary server for said video images;
    d) said video receivers and said video sources are not connected to each other;
    e) said primary server operative to aggregate requests received from said video receivers and send said requests to said video sources for said video images and replicate and transmit said video images to said video receivers, said server only requests a frame from the video source when there is a request for the frame from a user, and while this request to the video source remains outstanding the server registers any further requests for the next frame from the video source but the server does not generate any additional requests to the video source for the next frame while a request remains outstanding; and
    f) a software program enabling said primary server to create a list of requests from said one or more video receivers such that a video image is sent once from one of said one or more video sources to said primary server and for each request on said list said video image is sent once from said primary server to said video receiver making said each request.

2. The system according to claim 1, wherein one or more of said video sources are selected from video cameras and video storage units containing recorded video images; and one or more of said video receivers are video storage units for recording video images from one or more of said video sources.

3. The system according to claim 1, wherein said system can add and remove video sources without interrupting the operation of the system.

4. The system according to claim 1, wherein said system can add and remove video receivers without interrupting the operation of the system.

5. The system according to claim 1, including one or more secondary servers, and said primary server being capable of redirecting one or more of said video sources and one or more of said video receivers to one of said secondary servers, each said secondary server functioning to transmit video images in the same manner as said primary server.

6. The system according to claim 1, wherein said video sources and said video receivers are connected to said primary server via a Local Area Network (LAN).

7. The system according to claim 1, wherein said video sources and said video receivers are connected to said primary server via the Internet.

8. The system according to claim 1, wherein one or more of said video sources are located on a private Local Area Network (LAN) with a firewall on said LAN between said video sources and said primary server.

9. The system according to claim 1, wherein one or more of said video receivers are on a private Local Area Network (LAN) with a firewall on said LAN between said video receivers and said primary server.

10. A method of allowing one or more video receivers to receive video images from one or more video sources, comprising:
   a) connecting said one or more video sources to a video server, said one or more sources operative to send video images to said video server only upon receiving a request from said video receiver;
   b) creating a source list on said video server identifying said one or more video sources;
   c) connecting one or more video receivers to said video server;
   d) providing each of said one or more video receivers with said source list;
   e) sending a request from one of said one or more video receivers to said video server for a video image from one of said video sources;
   f) creating a distribution list on said video server listing all requests received from said one or more video receivers for a video image from one of said video sources;
   g) aggregating all requests for said video image from said one of said video sources;
   h) sending a request from said video server to said one of said video sources for said video image and while this request to the video source remains outstanding the server registers any further requests for the next video image from the video source but the server does not generate any additional requests to the video source for the next video image while a request remains outstanding;
   i) sending said video image from said video source to said video server;
   j) sending said video image from said video server to all video receivers on said distribution list; and
   wherein said one or more video receivers are not connected to said one or more video sources.

11. A method according to claim 10, wherein one or more of said video sources are located on a private Local Area Network (LAN) with a firewall on said LAN between said video sources and said video server.

12. A method according to claim 10, wherein one or more of said video receivers are on a private Local Area Network (LAN) with a firewall on said LAN between said video receivers and said video server.

13. A method according to claim 10, including adding and removing video sources from said source list without interrupting operation of said video server.

14. A method according to claim 10, wherein said sending steps are performed using TCP/IP protocol.

15. A method according to claim 10, wherein said video server, said video sources, and said video receivers are connected by a Local Area Network (LAN).

16. A method according to claim 10, wherein said video server, said video sources, and said video receivers are connected by the Internet.

17. A method according to claim 10, wherein any of said video sources and video receivers can be redirected to a different video server.

18. A method according to claim 10, wherein a first video server is a video receiver of a second video server in order to request video images from the video sources connected to said second video server, so that said first video server can make said video sources available to video receivers connected to said first video server as if said video sources were connected directly to said first video server.

* * * * *

UNITED STATES PATENT AND TRADEMARK OFFICE
CERTIFICATE OF CORRECTION

PATENT NO. : 7,659,922 B2 Page 1 of 1
APPLICATION NO. : 10/460240
DATED : February 9, 2010
INVENTOR(S) : Black et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1452 days.

Signed and Sealed this

Twenty-eighth Day of December, 2010

David J. Kappos
*Director of the United States Patent and Trademark Office*